No. 727,963. Patented May 12, 1903.

UNITED STATES PATENT OFFICE.

MYRTIL KAHN, OF ELBERFELD, GERMANY, ASSIGNOR TO FARBENFABRIKEN OF ELBERFELD CO., OF NEW YORK, N. Y., A CORPORATION OF NEW YORK.

AZO DYE.

SPECIFICATION forming part of Letters Patent No. 727,963, dated May 12, 1903.

Application filed February 16, 1903. Serial No. 143,630. (No specimens.)

*To all whom it may concern:*

Be it known that I, MYRTIL KAHN, doctor of philosophy, chemist, residing at Elberfeld, Germany, (assignor to the FARBENFABRIKEN OF ELBERFELD CO., of New York,) have invented a new and useful Improvement in Azo Coloring-Matters; and I do hereby declare the following to be an exact and clear description of my invention.

My invention relates to the production of new and valuable azo dyestuffs by combining the diazo compounds of ortho-amidophenol derivatives having the following general formula:

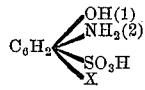

(X meaning a hydrogen atom which can be replaced by halogen atoms, $-SO_3H$ or $-CH_3$,) such as ortho-amidophenol or cresol sulfonic acids, ortho-amidophenol-chloro-sulfonic acids, ortho-amidophenol-orthopara-disulfonic acid, or the like, with 1:7 amidonaphthol having the formula:

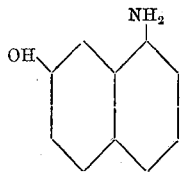

The new dyestuffs thus obtained are brownish-black powders soluble in water with from a reddish-violet to bluish-violet color, turning blue by adding a solution of sodium carbonate, dyeing wool from acid-baths violet shades, turning black by a subsequent treatment with chromium compounds, reacting as oxidizing agents. The black shades thus obtained are distinguished by great fastness to the "potting" process, which is a finishing process for woolen piece goods. In this process the goods are entered into boiling water and allowed to remain there until the water is cold. The goods thus assume a high degree of gloss and softness, and, according to the effect desired, the potting may be repeated several times.

In carrying out my process practically I can proceed as follows, the parts being by weight: Nineteen parts of ortho-amidophenol-para-sulfonic acid

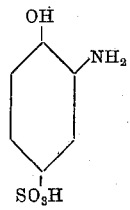

are diazotized in the usual manner, and the resulting diazo compound is stirred into a solution of sixteen parts of 1:7-amidonaphthol in caustic-soda lye and mixed with ice-water. Care must be taken that the mixture remains alkaline during the whole reaction. After being stirred for some time the excess of caustic-soda lye is neutralized by means of hydrochloric acid, and the new dyestuff is precipitated by the addition of common salt, filtered off, and dried.

The new coloring-matter thus obtained is in the shape of the sodium salt a brownish-black powder soluble in water and in alcohol with a violet color and soluble in concentrated sulfuric acid of 66° Baumé with a bluish-red color, a reddish-brown precipitate being obtained by the addition of ice. It dyes wool from acid-bath violet shades. By subsequently treating the dyed fiber with chromium compounds, reacting as oxidizing agents—such as chromates, bichromates, or the like—the shades are changed to black distinguished for great fastness to the potting process. They also resist milling and washing and possess a good fastness against the action of light.

Having now described my invention, what I claim is—

1. The herein-described new azo dyestuffs derived from ortho-amidophenol derivatives having the above-given general formula and 1:7-amidonaphthol which, when in a dry state, are brownish-black powders soluble in water with from a reddish-violet to bluish-violet color turning blue by adding a solution of sodium carbonate; dyeing wool from acid-bath violet shades turning black by a subsequent treatment with chromium compounds reacting as oxidizing agents, substantially as hereinbefore described.

2. The herein-described new azo dyestuff derived from ortho-amidophenol para-sulfonic acid and 1:7-amidonaphthol which, in the shape of the sodium salt, is, when dry and pulverized, a brownish-black powder soluble in water and in alcohol with a violet color and being soluble in concentrated sulfuric acid of 66° Baumé with a bluish-red color, a reddish-brown precipitate being obtained by adding ice; dyeing wool from acid-bath violet shades which are changed to black by a subsequent treatment with chromium compounds reacting as oxidizing agents, substantially as hereinbefore described.

In testimony whereof I have signed my name in the presence of two subscribing witnesses.

MYRTIL KAHN.

Witnesses:
OTTO KÖNIG,
J. A. RITTERSHAUS.